United States Patent [19]
Ball

[11] Patent Number: 4,635,059
[45] Date of Patent: Jan. 6, 1987

[54] VEHICLE MOUNTED DOPPLER RADAR SYSTEM

[75] Inventor: Alan K. Ball, Weedon, England

[73] Assignee: Plessey Overseas Limited, Ilford, England

[21] Appl. No.: 497,687

[22] Filed: May 24, 1983

[30] Foreign Application Priority Data

May 25, 1982 [GB] United Kingdom ............... 8215268

[51] Int. Cl.4 .................... G01S 13/60; G01S 13/62
[52] U.S. Cl. .................................. 342/117; 342/194; 342/70
[58] Field of Search ............... 343/8, 7 VM; 180/169; 367/89, 90, 91

[56] References Cited

U.S. PATENT DOCUMENTS

| | | | |
|---|---|---|---|
| 3,181,148 | 4/1965 | Schiftman | 343/7 VM |
| 3,680,098 | 7/1972 | Harris et al. | 343/7.7 |
| 3,833,906 | 9/1974 | Augustine | 343/8 |
| 3,893,076 | 7/1975 | Clifford | 343/8 |
| 3,918,058 | 11/1975 | Hoyori et al. | 343/8 |
| 4,050,071 | 9/1977 | Clorfeine | 343/8 |
| 4,107,680 | 8/1978 | Kaplan | 343/8 |
| 4,414,548 | 11/1983 | Carpenter et al. | 343/8 |

FOREIGN PATENT DOCUMENTS

| | | |
|---|---|---|
| 1273530 | 9/1961 | France . |
| 888975 | 2/1962 | United Kingdom . |
| 1245871 | 9/1971 | United Kingdom . |
| 1403358 | 8/1975 | United Kingdom . |
| 1487701 | 10/1977 | United Kingdom . |
| 2004158 | 3/1979 | United Kingdom . |
| 2052204 | 1/1981 | United Kingdom . |

Primary Examiner—T. H. Tubbesing
Assistant Examiner—Gilberto Barrón, Jr.
Attorney, Agent, or Firm—Fleit, Jacobson, Cohn & Price

[57] ABSTRACT

A Doppler radar system for mounting on a vehicle to sense the speed of movement of the vehicle and to provide an output proportional to the speed of the vehicle. The output is substantially free from errors due to the vibration and of the vehicle. A Janus configuration is also provided which also eliminates errors due to the angle of tilt of the vehicle.

7 Claims, 12 Drawing Figures a) $Vh=0$, $Vg=CONSTANT$ b) $2\pi f_m A \tan\theta / Vg < 1$, $Vg=CONSTANT$ c) $2\pi f_m A \tan\theta / Vg > 1$, $Vg=CONSTANT$ d) $Vh = A \sin 2\pi f_m t$, $Vg=0$

VEHICLE MOUNTED DOPPLER RADAR SYSTEM

BACKGROUND

The present invention relates to Doppler Radar Systems and more particularly to a radar system for mounting on a vehicle to give an indication of the speed of such a vehicle.

There are particular problems where the speed of a slow moving vehicle requires to be assessed with accuracy. Previously known radars when mounted on such a vehicle produce inaccurate results due to the tilting and/or the vibration of the vehicle which affects the output of the Doppler radar which is attempting to measure the relative movement between the vehicle and the ground. In such cases it has been found more accurate to use a mechanical arrangement associated with the wheels of the vehicle but this has the disadvantage that where slipping of the wheels often occurs such as in the case of agricultural tractors an equally inaccurate speed measurement is produced. Where the speed measurement is used, for example to control the rate of application of a spray, this can lead to overspraying which can be extremely serious. Thus it is extremely important to be able to accurately measure the forward (or backward) speed of movement of a vehicle and the present invention seeks to provide for such a measurement.

OBJECT OF THE INVENTION

It is an object of the present invention to provide a doppler sensing radar with the following parameters.
1. High Accuracy
2. Fast Response Time
3. Insensitivity to Installation Errors
4. Simple Construction
5. Minimisation of Errors due to Vibration

SUMMARY OF THE INVENTION

The present invention therefore uses a direction sensing doppler module and novel data processing to enhance rejection of vibrationally induced erroneous doppler signals. This enables very low speeds to be measured, even when the radar platform is vibrating. The vibrationally induced false doppler signals are treated as direction sensitive displacement measurements which are "integrated" in a true displacement averaging circuit.

By combining two radars of the type described above into a Janus configuration, further advantages are gained. The composite system retains the ability to operate at very low speeds, and also has the advantage of compensation for tilt induced errors.

(Previously published Janus configured systems do not cancel vibrationally induced errors if the platform speed is below a threshold).

According to the present invention there is provided a doppler radar systems for mounting on a vehicle including means for obtaining quadrature doppler frequency output signals from respective detectors, amplifying means for amplifying and squaring the output signals, including logic means for producing from said amplified and squared signals two pulse trains indicative of forward and reverse motion and including combining means for combining together said forward and reverse pulse trains to produce an output proportional to the forward motion of the vehicle substantially independent of the vibration of the vehicle.

According to the present invention there is also provided a vehicle mounted doppler radar system including a first, forward looking doppler radar and a second rearward looking doppler radar in which each of said first and second doppler radar systems comprises a quadrature mixer in which both in phase and quadrature signal outputs are produced, in which the in phase and quadrature outputs are combined to produce first and second signals and in which said first and second signals are combined to produce a third output signal which is proportional to the speed of the vehicle and in which the third output signal is substantially insensitive to the tilting of the vehicle and to the vibration of the vehicle.

BRIEF DESCRIPTION OF THE DRAWINGS

Embodiments of the present invention will now be described with reference to the accompanying drawings in which.

DETAILED DESCRIPTION OF THE DRAWINGS

Figure 1:
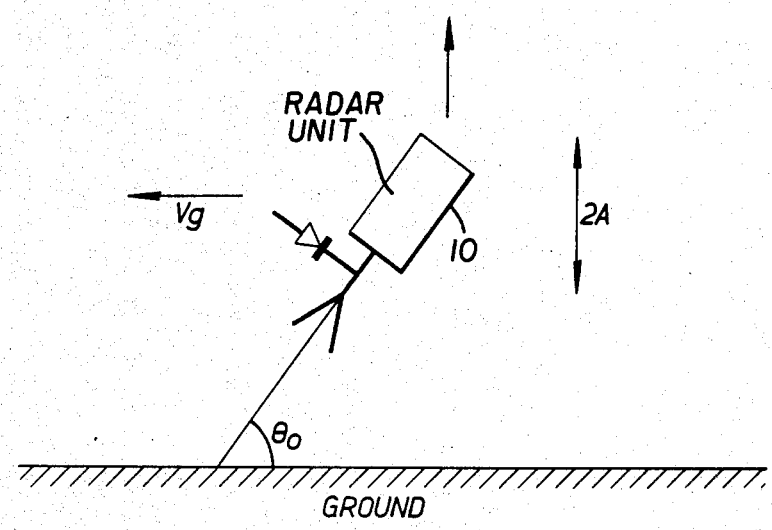
FIG. 1 shows a simple doppler radar with a single mixer.

Referring now to FIG. 1, a simple doppler radar (with a single mixer, balanced mixer or using the active element (gunn, impatt . . . ) as the mixing element can be used to measure ground speed under ideal conditions.

The doppler signal (FD) at the mixer is given by $$fD = \frac{2V_g f \cos \theta_o}{C} \text{ Hz}$$

Vg is the true ground speed m/sec
f is the transmitter frequency Hz
C is the speed of light m/sec
$\theta_o$ is the included angle between ground and principal axis of transmitter beam.

The transmitter can operate anywhere in the electromagnetic spectrum, or can use ultrasonics, in which case C is the speed of sound.

The system of FIG. 1 however has the following limitations:

Tilt

If the angle $\theta$ changes or is incorrectly set, then the apparent speed Vg' will be in error. This is particularly a problem where the radar platform orientation changes due to variable loading of the vehicle etc.

If $\theta = \theta_o + \delta$ then the error in indicated speed will be $-(\tan \theta) \times \delta$ ($\delta$ small)

Vibration

Assume the radar platform has a vertical sinusoidal displacement of A(pk) with a vibrational frequency fm. The simple radar will result in an indicated ground speed Vgo when the true ground speed Vg is zero.

$$Vgo = 4fmA \tan \theta.$$

This is true of all radars, ultrasonic, microwave or laser. It can be shown that the true ground speed Vg must must exceed a threshold speed Vgmin, before the average indicated speed is equal to the true ground speed. For Vg < Vgmin, the averaged value of the indicated speed always exceeds the true ground speed.

$$Vgmin = 2\pi fmA \tan \theta$$

Figure 5:
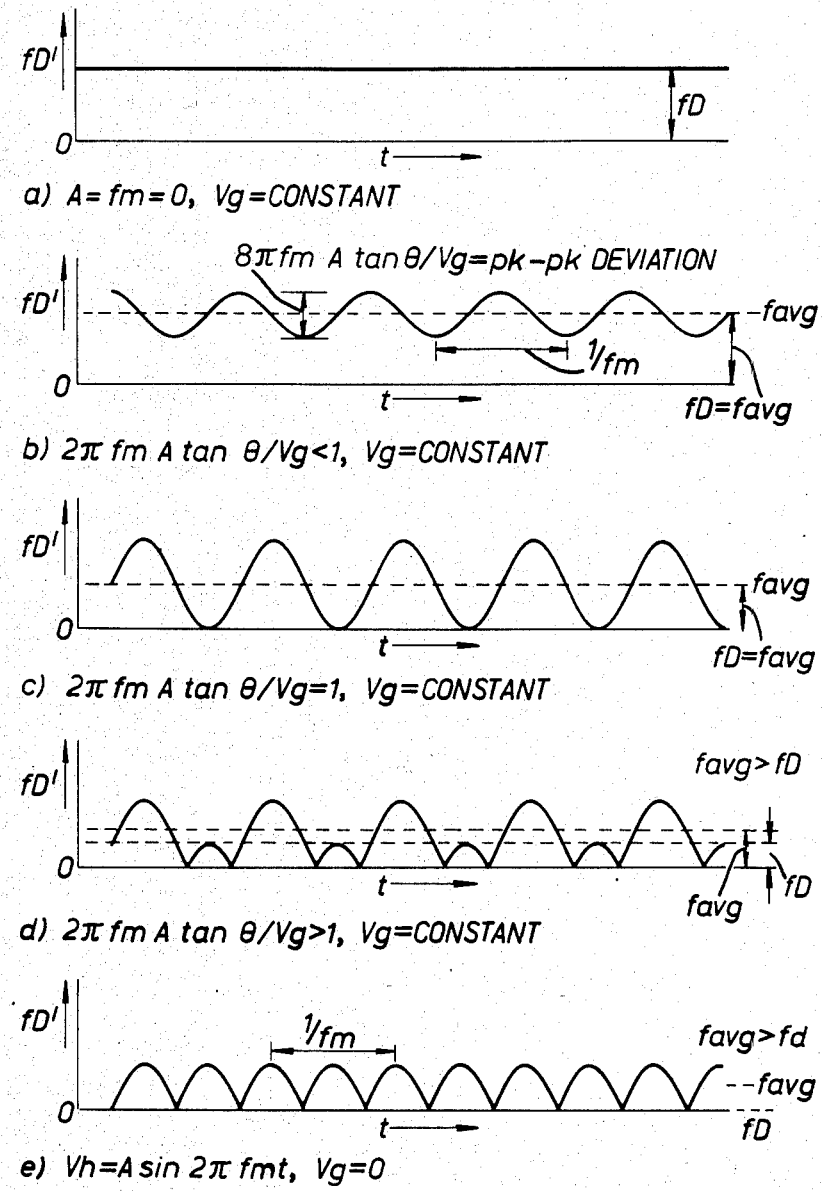
FIG. 5 shows a number of graphs showing the effects of vertical vibration on the system of FIG. 1.
Figure 6:
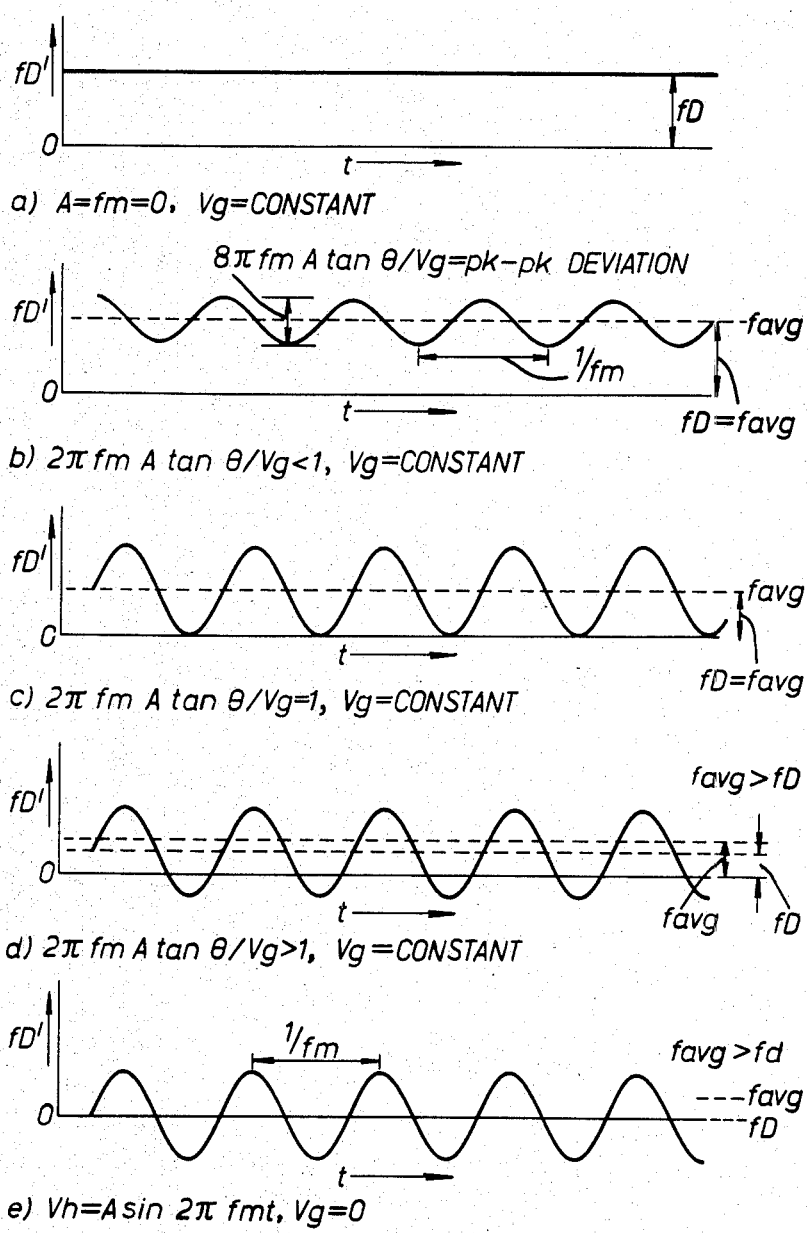
FIG. 6 shows a number of graphs showing the effects of vertical vibration on the system of FIG. 2.

FIG. 5 shows how the doppler frequency fD due to the true ground speed is frequency modulated in the presence of vertical vibration to produce an indicated instantaneous doppler frequency fD.

For $Vg \geq 2\pi$ fmA $\tan \theta = Vgmin$, the FD averaged over a period that is long compared to 1/fm will equal the true doppler frequency fD.

If Vg < Vgmin, then fD' undergoes a phase reversal as fD' instantaneously goes to zero. In a simple pulse counting system, the value of fD' is effectively rectified, leading to fD' means > fD. Hence at low speeds, false readings will result.

In summary therefore the simple radar of FIG. 1 has the following limitations.
  i. sensitivity to tilt
  ii. inability to give accurate results when Vg < Vgmin.

Figure 2:
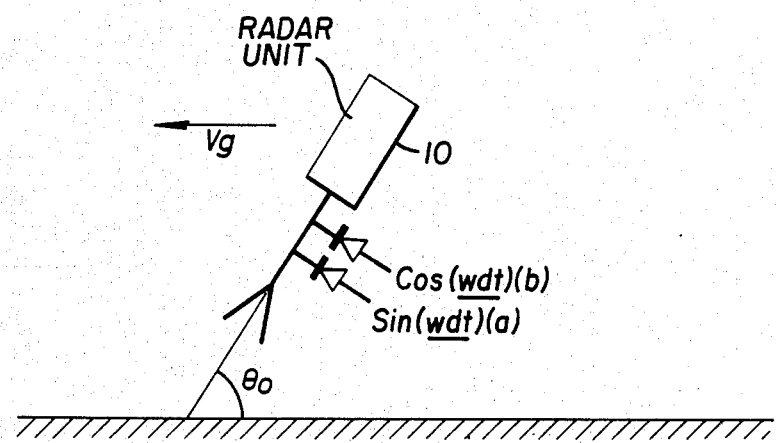
FIG. 2 shows a modification of the radar system of FIG. 1 on which the receiver is configured with a quadrature mixer.

Referring now to FIG. 2, this radar is similar to that in FIG. 1, but the receiver is configured with a quadrature mixer, whereby the doppler signal is available at two ports, but in phase quadrature. By using two mixer elements and a quadrature I.F. it is possible to measure velocity rather than speed. The directional information can be used to prevent the "rectification" of fD' at low values of Vg in conditions of vibration (on vertical modulation of the target).

The information detection of the directional information can be achieved in several ways. For single targets with a high signal/clutter ratio it is only necessary to look at the lead/lag relationship between the two doppler signals. If the lead/lag decision is made at every zero crossing of the doppler signals from both mixers, and a pulse is generated at every zero crossing and subsequently steered into two channels, dependent on the lead/lag decision, then two pulse trains will be generated, one corresponding to forward displacements and the other backwards displacements with respect to the intended direction of travel. The pulse stream frequency will be at 4 times the doppler frequency.

In simple systems it is normally sufficient to look at this relative phasing once per doppler cycle of one of the mixers, though the present method, equivalent to 4 times per doppler cycle, improves the data rate and hence the response time, and also greatly improves noise rejection.

Each pulse corresponds to a fixed displacement of the radar relative to the ground, as the pulse rate is proportional to speed. The two pulse trains when subtracted and averaged over a time period long compared to 1/fm will now give the true mean doppler frequency, and so under conditions of vibration with low ground speed the indicated doppler speed now equals the true ground speed.

The limitations of this system are:
  i. unit is still sensitive to tilt vibrations
  ii. averaging period >> 1/fm.

The advantages of the system are however:
  i. Insensitive to vibration
  ii. Higher data rate
  iii. Improved rejection of noise and vibrational clutter.

Figure 3:
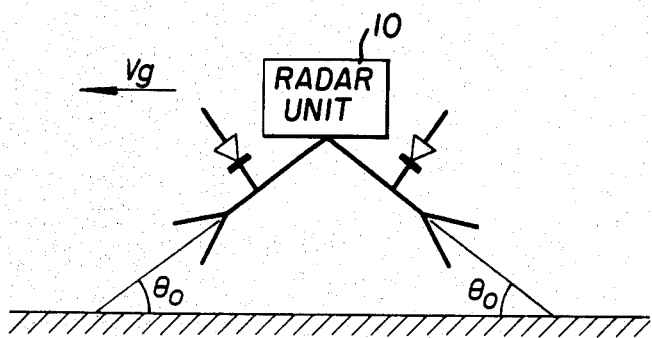
FIG. 3 shows a simple Janus radar system.

Referring now to FIG. 3, this type of system is well known. Dual and four beam systems are used in doppler navigators in aircraft. For low speed use under conditions of vibration, such as configuration has the same low speed threshold, Vgmin as the simple system of FIG. 1. However, at speeds > Vgmin the vibrational modulation on the doppler signals of both mixers are in antiphase, and so when the pulse trains are interlaced, the vibrational components cancel, and the desired signals reinforce.

Figure 7:
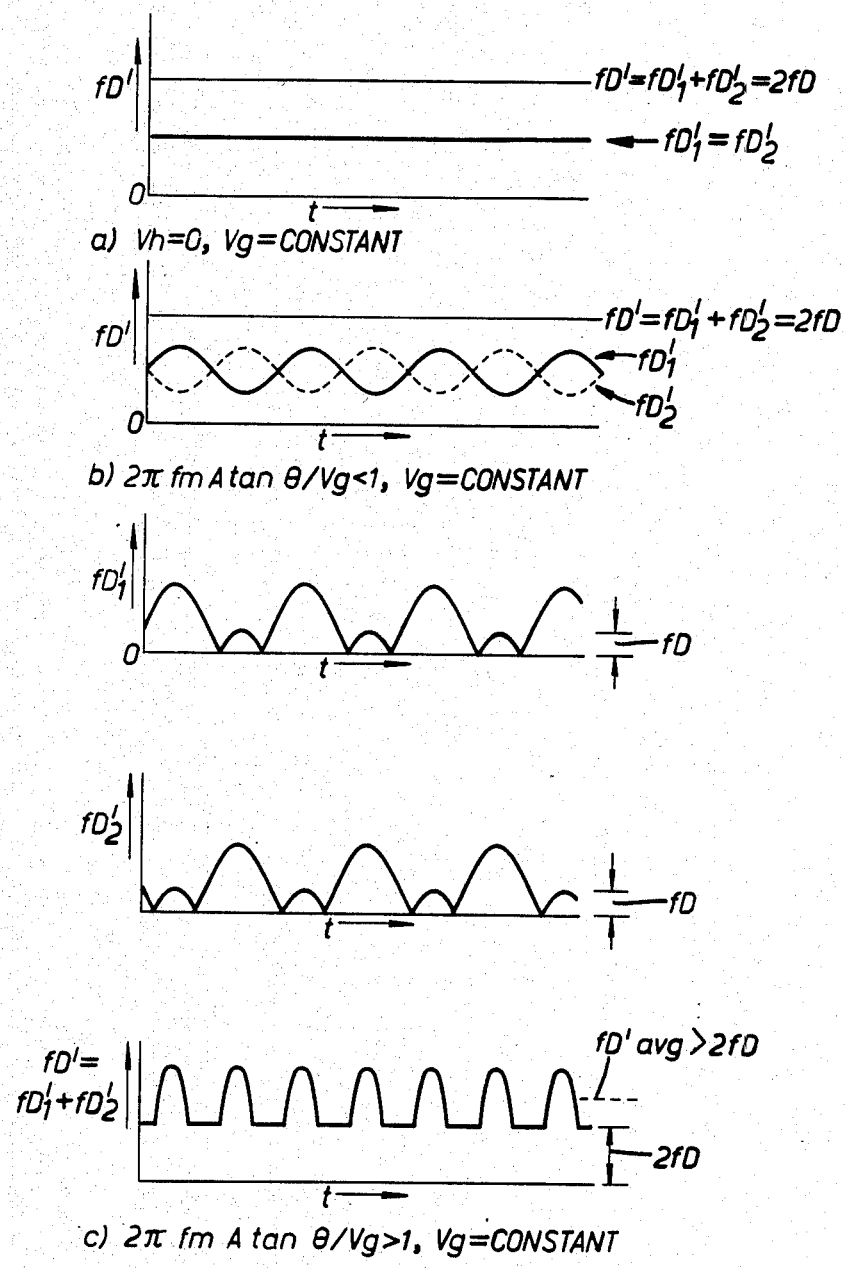
FIG. 7 shows a number of graphs showing the effects of vertical vibration on the system of FIG. 3.

The principal reason for the Janus configuration is to limit the effects of tilt. With this type of radar, variations in $\theta$ due to the radar platform tend to cancel. The error is $(1 - \cos \delta)$. The doppler frequencies at the mixers are shown in FIG. 7.

The principle limitation of this system is that it is still subject to threshold speeds Vgmin = $2\pi$ fmA $\tan \theta$ for accurate speed indication.

Its advantages are as follows:
  i. Insensitive to tilt variations
  ii. Averaging period to remove vibrational effects = 0 (Vg ≧ Vgmin)
  iii. Data rate as high as Simple Direction Sensing radar.
  iv. Spectral bandwidth reduced by $\sqrt{2}$ due to uncorrellated signals from the mixers.

Figure 4:
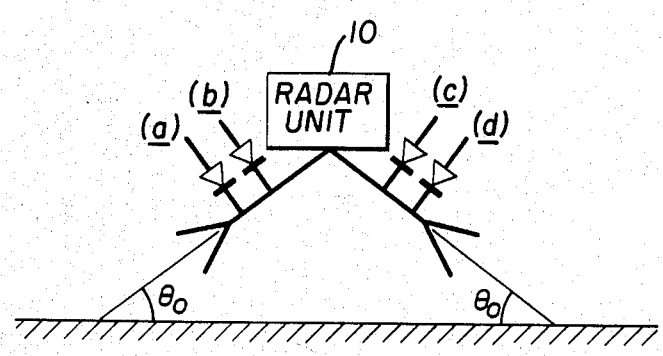
FIG. 4 shows a direction sensing Janus radar system.

Direction Sensing Janus Radar (FIG. 4)

Figure 8:
FIG. 8 shows a number of graphs showing the effects of vertical vibration on the system of FIG. 4, FIGS. 9, 9a show in block diagrammatic form circuitry for the arrangement of FIG. 2 in accordance with the present invention.
Figure 8:
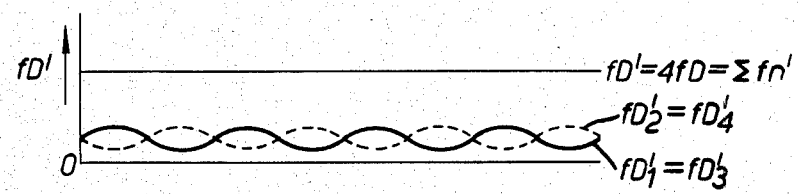
Figure 8:
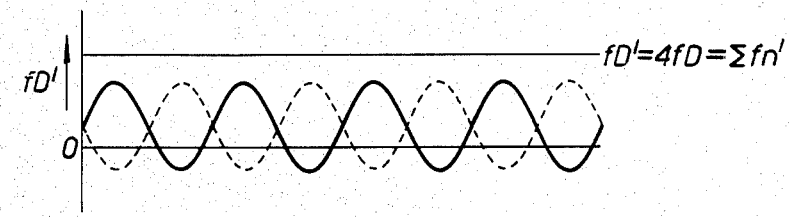
Figure 8:
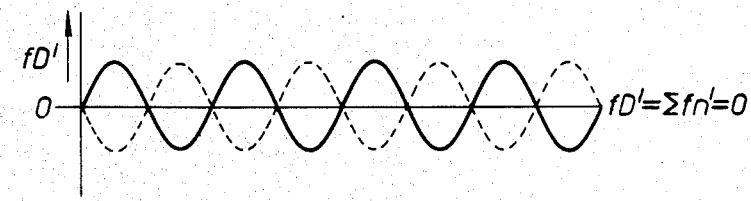

With reference to FIG. 4 there is shown a direction sensing Janus radar. This system is an amalgam of the simple direction sensing radar and the Janus configuration. The doppler signals in the presence of vibration are shown in FIG. 8.

The advantages of this system are:
  i. Insensitive to tilt
  ii. Averaging period to remove vibrational effects ≈ 0.
  iii. Vgmin = 0
  iv. Very high data rate (8 times doppler frequency)
  v. Good noise and vibrational clutter rejection
  vi. Spectral bandwidth reduced by $\sqrt{2}$ due to uncorrelated signals from the front and rear radars.

Figures 9, 9A:
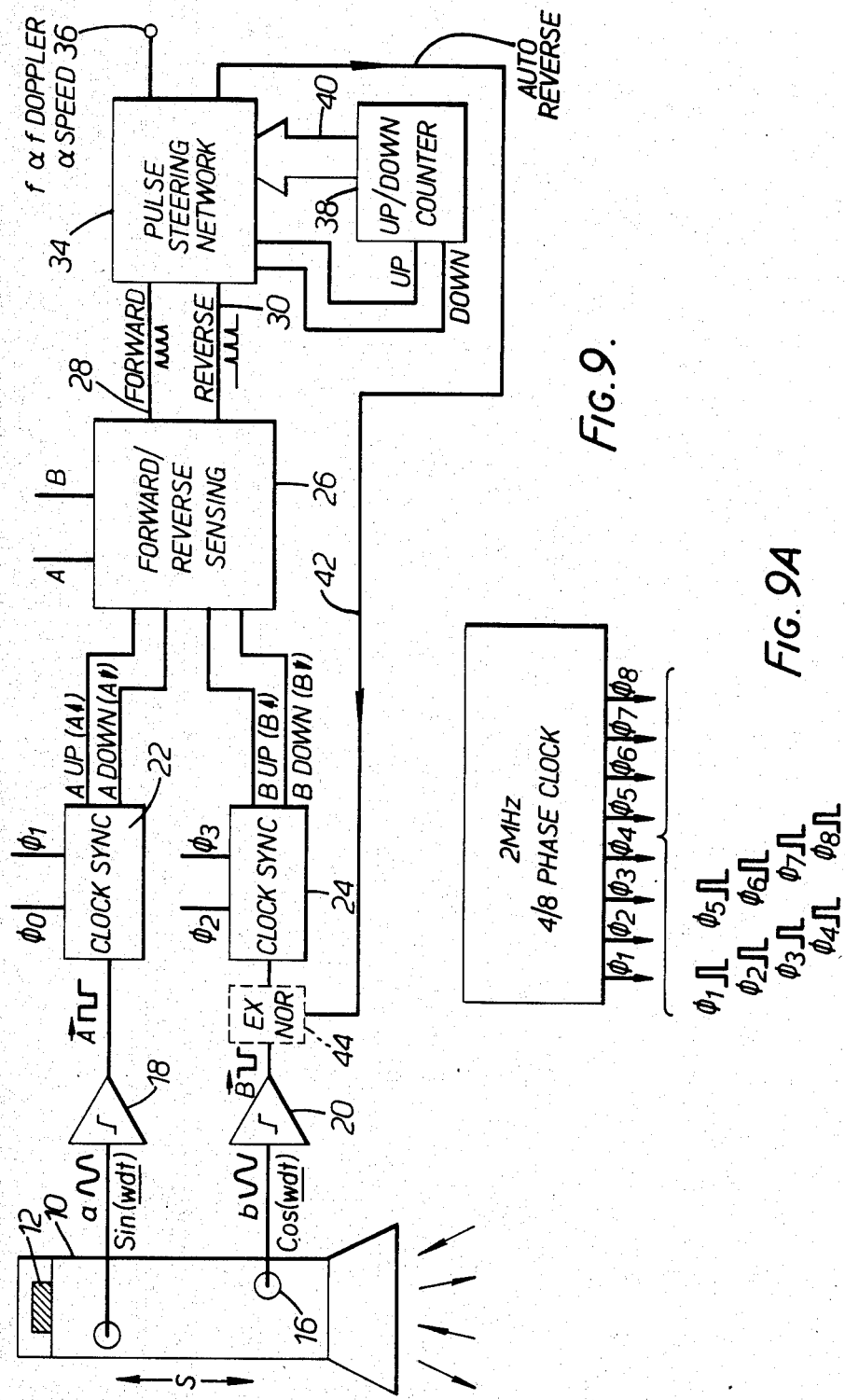

With reference now to FIG. 9 there is shown in block diagrammatic form the circuitry for the invention as described with reference to FIG. 2.

The two inputs sin (wdt) and cos (wdt) are obtained from for example a Gunn diode direction sensing module 10 comprising a Gunn diode 12 and first and second detectors 14, 16. In operation the Gunn diode 12 emits a high frequency signal (several GHz) which is mixed with the reflected signal from the ground to give quadrature output signals cos (wdt) and sin (wdt). The signals are in quadrature because of the physical spacing S between the detectors 14 and 16.

For convenience the signals sin (wdt) and cos (wdt) which carry the doppler frequency information will be referenced a and b respectively. These signals are both amplified in respective high gain amplifiers 18, 20 to give square wave output signals A and B. Signals A and B are fed to respective clock synchronization circuits 22, 24 where the rising edge of each of the pulses is synchronized with clock pulses $\phi_0$ and $\phi_2$ and falling edge with clock pulses $\phi_1$ and $\phi_3$. This gives four output pulse streams of narrow clock rate pulses from the clock sync circuits AUP, ADOWN and BUP, BDOWN respectively. Because of the use of a four phase clock each output pulse will have its own specific time period not overlapping any other pulse.

The four phase clock is generated by dividing down a 2 MHz clock into four or eight individual clock pulse trains. For a four phase clock each pulse train has a rate of 500 KHz and for eight phase at 250 KHz. The eight phase clock is required for the embodiment of FIGS. 4 and 11 to be described hereinafter. The anticipated Doppler frequency will be of the order of less than 10 KHz so it may be seen that each edge of the waveform A or B can be fairly accurately clocked in synchronism with clock pulses which are at least twenty five times the Doppler frequency. Thus the AUP, ADOWN, BUP and BDOWN pulse trains will be clearly distinguishable in pulse timing. The pulse trains AUP, ADOWN, BUP, BDOWN are fed to a forward/reverse sensing circuit 26. In this circuit they are compared with the signals A and B by for example ANDing the signals together to produce forward and reverse pulse trains on outputs 28 and 30 respectively. This process is explained with reference to the timing diagram of FIG. 10.

Figure 10:
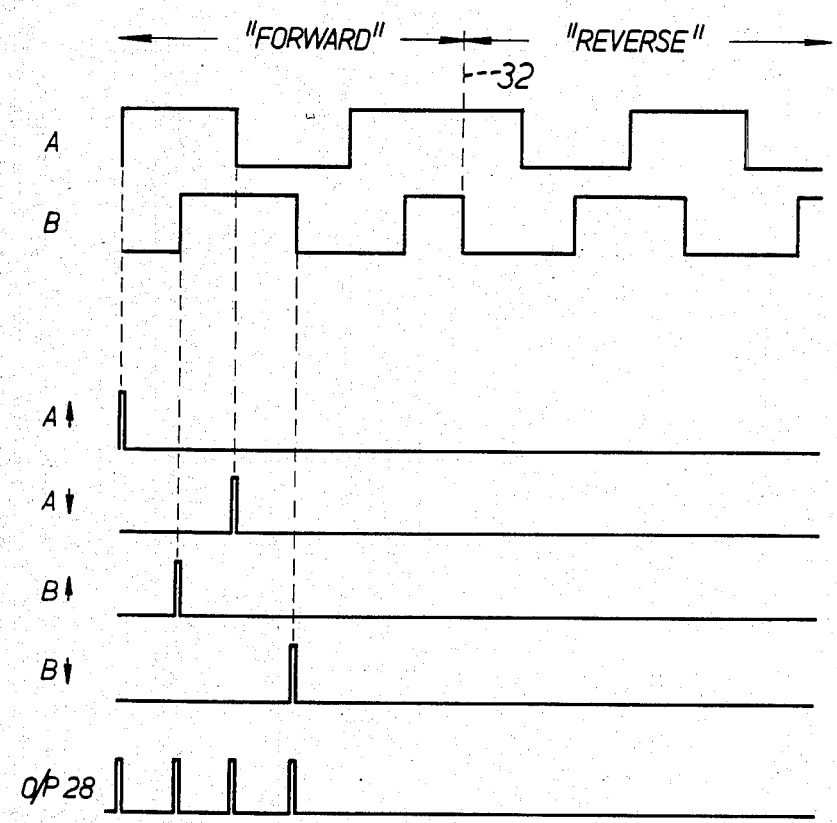
FIG. 10 shows a timing diagram for the forward/reverse sensing circuit of FIG. 9 and, FIG. 11 shows in block diagrammatic form circuitry for the arrangement of FIG. 4 in accordance with the present invention.

In FIG. 10 the forward output 28 is shown. If the vehicle on which the radar is mounted is moving forward without any vibration the AUP is ANDed with A to give first output pulse, ADOWN will be ANDed with A to give a second output pulse, BUP will be ANDed with B to give a third output pulse and BDOWN with B to give a fourth output pulse. If there is vibration in the system or other reasons to cause a phase change in the outputs cos (wdt) and sin (wdt) then the synchronism will be lost as shown in the right hand side of FIG. 10. With such a phase change indicated at 32 the output from the forward output 28 will cease because the signals AUP etc will not be ANDed with the signals A, B to give outputs. Thus no outputs will appear at 28 but a pulse train will appear at output 30 where the signals AUP etc are with other combinations of A and B to give outputs when a reverse or disturbed motion is present. The logic function of sensing synchronism of the pulses may be accomplished by AND or NAND functions since it may be seen from the dotted lines in FIG. 10 that the slightest change in synchronism of say pulse AUP with pulse A will result in a loss of an output pulse.

Thus on output 28 a forward pulse train is produced which will be the normal output. Only if there is vibration etc to result in loss of synchronism will pulses appear on the reverse output 30.

For normal operation the forward pulses are passed straight through a pulse steering network 34 to an output 36. The pulse repetition rate will be a proportional measure of the speed of the vehicle at output 36.

If however a reverse pulse is output on output 30 because of vibration etc then the pulse steering network detects this and feeds this pulse to the UP input of an up/down counter 38 which is normally set at zero. The up/down counter will continue to count upwards for each reverse pulse received. The pulse steering network 34 will be controlled by output 40 such that it can not output any more pulses to output 36 until the up/down counter has been returned to a zero state. This can be done by a simple AND function gating arrangement or by a flip-flop or other suitable means. Thus when the reverse pulses cease the forward pulses are fed to the down input of the up/down counter until it is returned to its zero state. Again this is accomplished with a simple logic gate controlled by the output of up/down counter 38.

The net result normally is that for vibratory conditions the pulse train output at output 36 will be an interrupted one, the interruptions occurring each time a reverse pulse is received. Thus if the vehicle is stationary and is vibrating there will be as many reverse pulses as forward pulses and the net output on output 36 will be zero. If the direction of motion of the vehicle is actually reversed then obviously the majority of pulses will be output on line 30 and the up/down counter will rapidly approach a full state. The maximum number stored by the counter is arranged such that this full state could not be reached by vibration or other non-synchronous problems. Thus when the full state is achieved a detector detects this as acknowledging that the vehicle is in reverse and outputs a signal on line 42 to supply an input to one input of an exclusive NOR gate 44 which effects a complete phase reversal (180°) to the B input causing B to lead A instead of the other way round. This then causes reversal of outputs 28 and 30 and thus the reverse direction is compensated for. Counter 38 will be counted back down to its zero state. The delay in read out will be relatively short whilst counter 38 counts up to its full state and following reversal back to a zero state.

Figure 11:
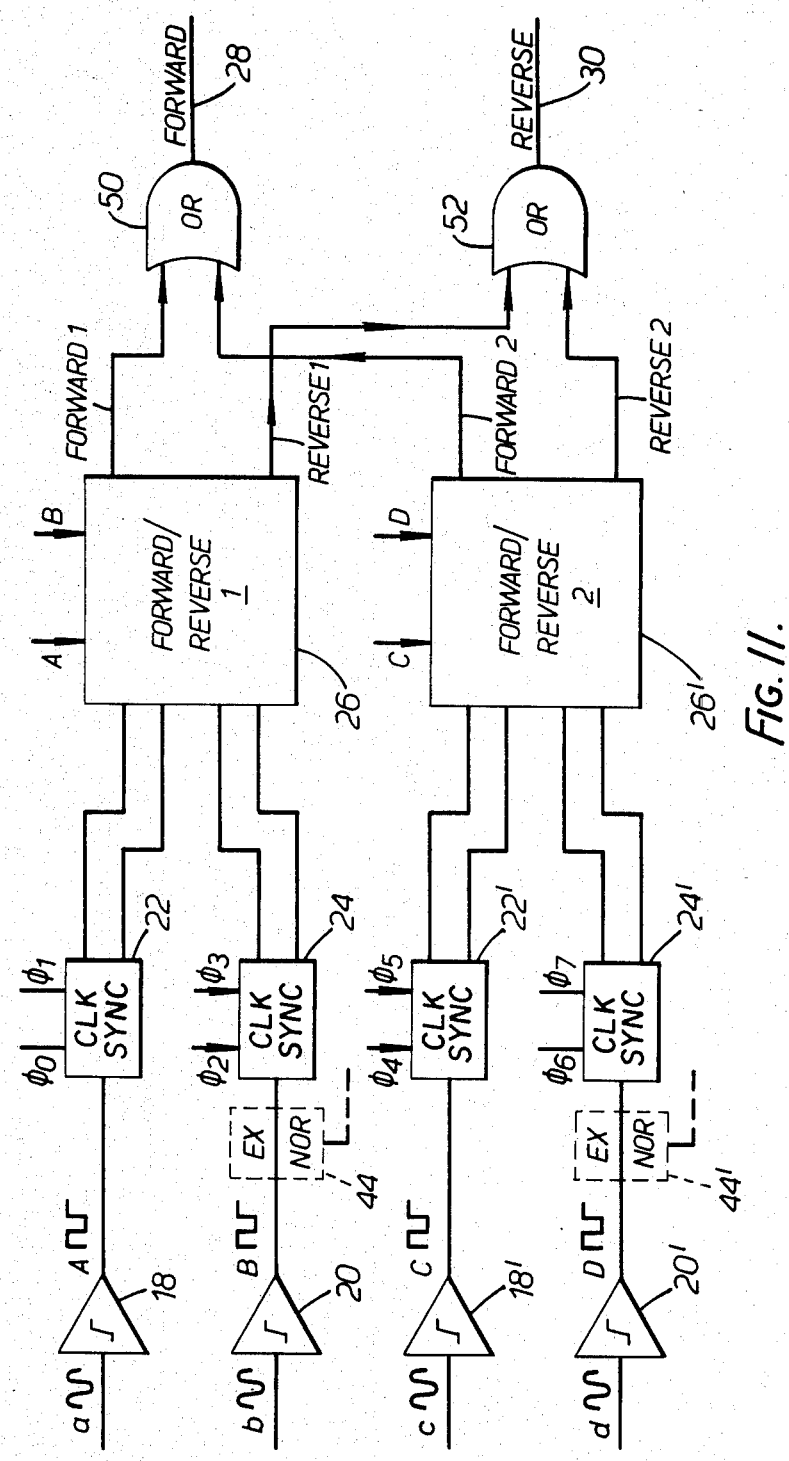

With reference to FIG. 11 the arrangement for the configuration of FIG. 4 is shown. There are four inputs a, b, c and d as shown in FIG. 4. Two will be as in FIGS. 2, 9, and the other two c and d will be from the radar looking in the opposite direction.

The processing of the signals c and d is similar to that for a and b as previously described except that the remaining four clocks $\phi_4$ to $\phi_7$ are used to ensure complete operation of all pulses. The same reference numerals with dashes indicate similar processing circuitry. A second forward/reverse network is provided to give forward and reverse pulses for outputs c and d and both sets of forward and reverse pulses are combined in OR gates 50, 52 to give combined output pulse trains on outputs 28 and 30 (see FIG. 9). From there the pulse trains are processed as in FIG. 9 to give the desired output and direction reversal.

I claim:

1. A doppler radar system for mounting on a vehicle including: at least two detectors spaced to provide in-phase and phase quadrature doppler frequency output signals with respect to one another; amplifying means for amplifying and wave squaring said detector output signals; logic means for producing from said amplified and wave squared detector output signals two pulse trains indicative of forward and reverse motion; and, combining means for summing together said forward and reverse pulse trains to produce a net output signal proportional to the forward motion of the vehicle, the logic means including respective first and second clock synchronism circuits for said amplified and squared in-phase and quadrature doppler signals in which the rising and falling edges of the signals are each synchronized with respective clocks from a four phase clock to produce four pulse trains, each individual pulse of which is non-synchronous with any other pulse and in which the four pulse trains are compared with the amplified and squared wave in-phase and quadrature doppler signals in a forward/reverse sensing circuit to produce said forward and reverse pulse trains.

2. A doppler radar system as claimed in claim 1 in which the combining means includes a pulse steering network and an up/down counter, in which the up/down counter is responsive to count the reverse pulses, the output of the combining means being inhibited whilst said up/down counter is in a non-zero condition and the forward pulses are steered to return said up/down counter to its zero condition following which the forward pulses are fed to the output of the combining means to form an output proportional to the forward speed of the vehicle.

3. A doppler radar system as claimed in claim 2 in which the combining means includes full count detection means for detecting when the up/down counter has reached a full state, the output of the full count detection means being connected to an exclusive NOR gate situated between the output of the quadrature amplifier and squaring circuit and its respective input of the logic means to cause a 180° phase reversal of the quadrature signal thus reversing the operation of the doppler radar system.

4. A doppler radar system for vehicle mounting including two systems as claimed in claim 1 in which are produced two in phase and two quadrature output signals for processing separately in said amplifying and logic means to produce first and second forward and reverse net output pulse trains which are combined together to produce a single forward and a single reverse net output pulse train with respect to each of said two systems for combining together in said combining means.

5. A doppler radar system for vehicle mounting as claimed in claim 1 wherein the detectors are associated with an emitter to provide a first, forward looking doppler radar system and a second, rearward looking doppler radar system in which each of said first and second doppler radar systems includes a quadrature mixer wherein both in-phase and quadrature signal outputs are produced, the in-phase and quadrature outputs are processed in each of said first and second radar systems to produce first and second net output signals, said first and second net output signals from said first and second radar systems are combined to produce a third output signal which is proportional to the speed of the vehicle and the third output signal is substantially insensitive to the tilting of the vehicle and to the vibration of the vehicle.

6. A doppler radar system for vehicle mounting as claimed in claim 1 wherein the detectors are mounted underneath the vehicle.

7. A doppler radar system for vehicle mounting as claimed in claim 1 wherein the detectors are associated with an emitter to provide a first, forward looking doppler radar system and a second, rearward looking doppler radar system mounted together in JANUS configuration in which each of said first and second doppler radar systems includes a quadrature mixer wherein both in-phase and quadrature signal outputs are produced, the in-phase and quadrature outputs are processed in each of said first and second radar systems to produce first and second net output signals, said first and second net output signals from said first and second radar systems are combined to produce a third output signal which is proportional to the speed of the vehicle and the third output signal is substantially insensitive to the tilting of the vehicle and to the vibration of the vehicle.

* * * * *